3,621,644
ROLL FORMING FODDER HARVESTERS
William Richard Clifford Geary, Flat 4, 18 Kensington
Road, South Yarra, 3141 Victoria, Australia
Filed Dec. 7, 1970, Ser. No. 95,685
Int. Cl. A01d 43/06
U.S. Cl. 56—341                                    10 Claims

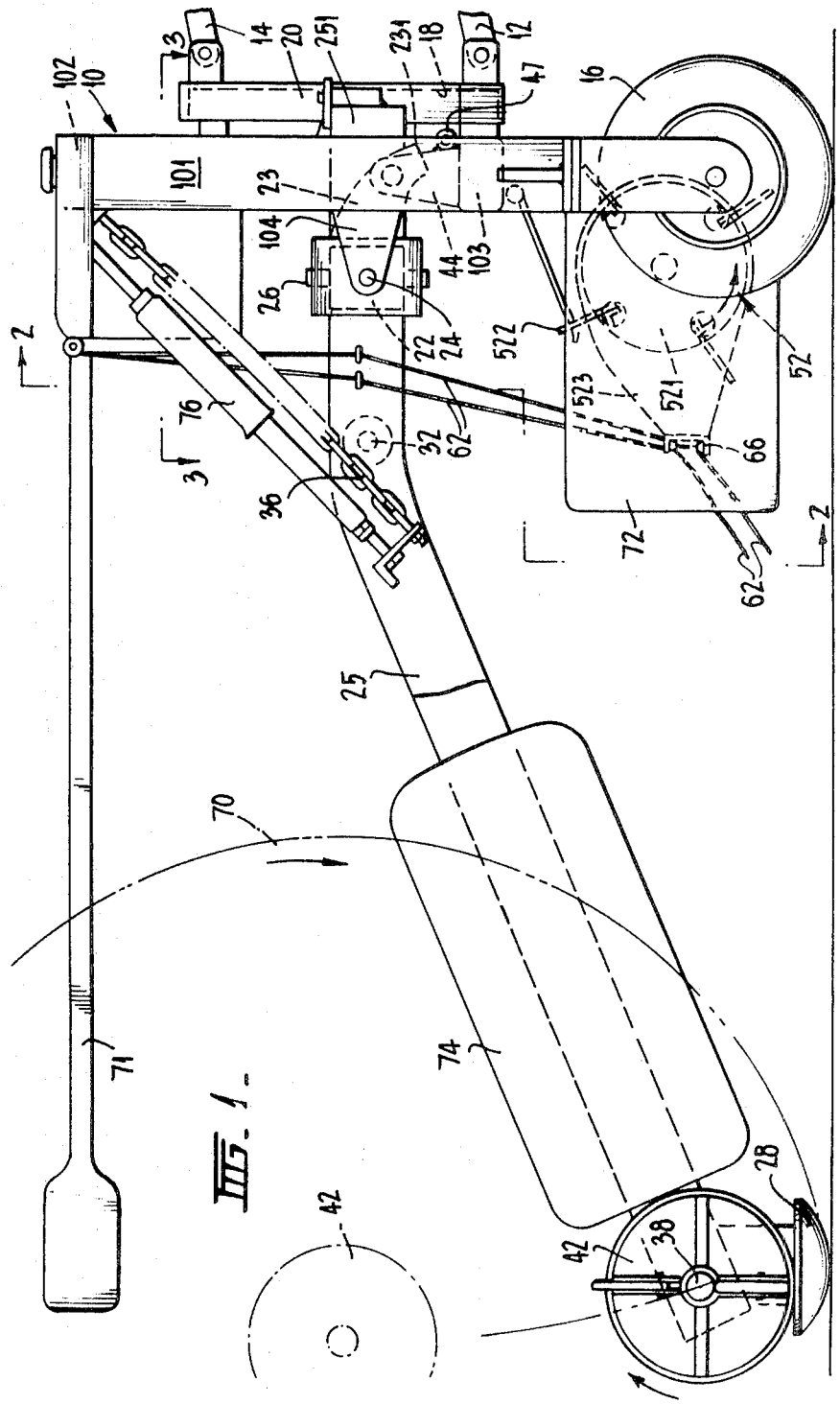

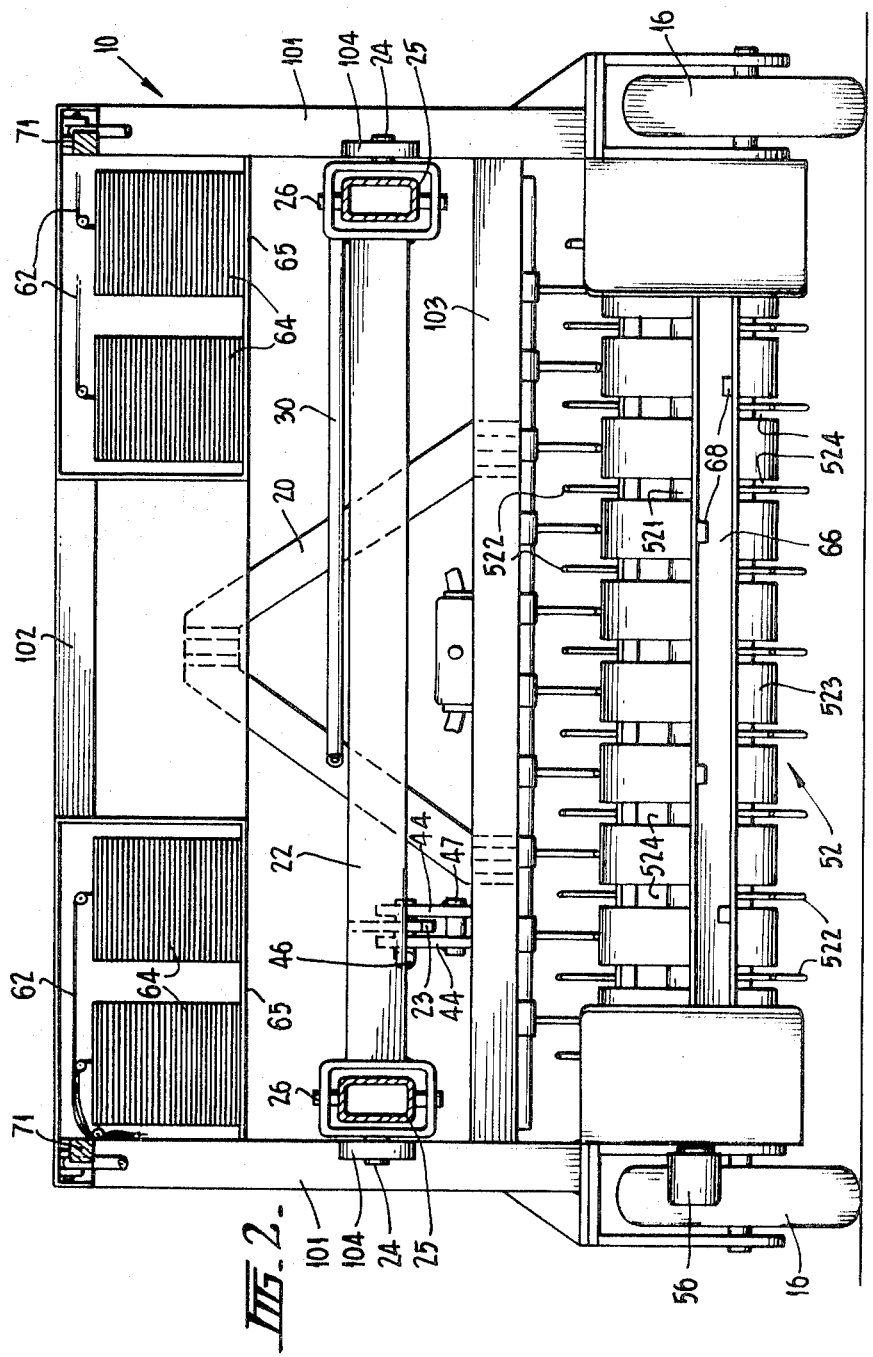

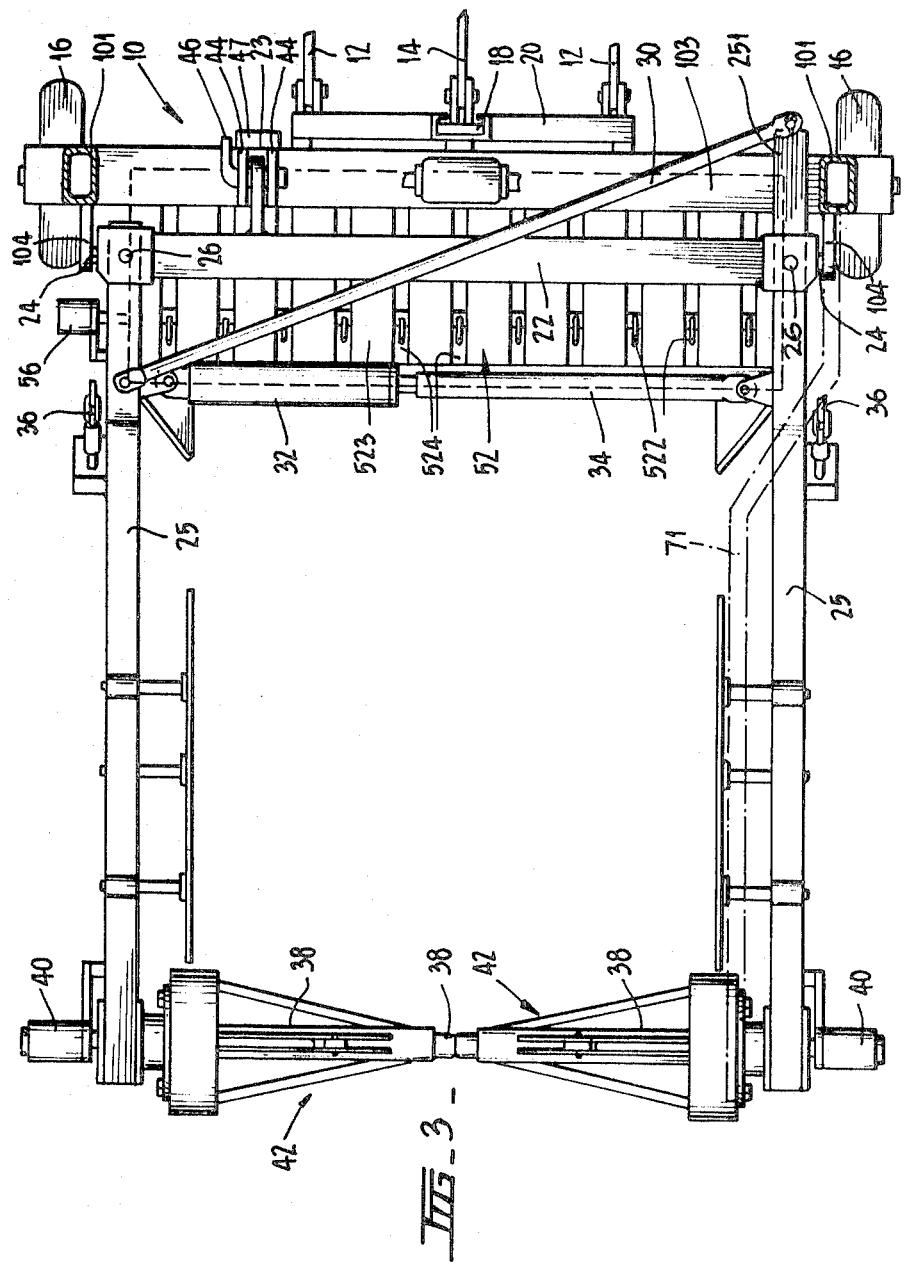

ABSTRACT OF THE DISCLOSURE

The invention relates to roll forming fodder harvesters having a frame adapted for attachment to the linkage of a towing tractor, and including a laterally spaced pair of longitudinally extending side arms which have their forward end portions pivoted to the frame to enable their free rear ends to swing upwardly and downwardly about a transverse axis. The free rear ends of the arms rotatively support transversely extending windrow winding means adapted to progressively roll up a swathe of mown fodder as it lies on the ground thereby to form a roll which rolls along the ground and which progressively raises the side arms as it increases in diameter.

According to the invention, the pivoted side arms are connected to the frame by means, for example chains, which limit the downward movements of the arms while permitting them to rise, whereby the said arms may be lifted clear of the ground when the frame is lifted by the tractor linkage.

The invention also provides means for locking the pivoted side arms to the frame so as to prevent angular movements therebetween whereby the harvester, when detached from the tractor, may be supported stably on the ground.

The invention further provides an opposed pair of longitudinally extending stabilising arms which project rearwardly from the frame and which have their free rear ends located so as to be engageable with the opposite ends of a fodder roll being formed about the winding means thereby to restrain endwise movements of the roll.

This invention relates to roll forming fodder harvesters of the general type disclosed in my copending applications Ser. Nos. 769,192 and 888,354, respectively filed Oct. 21, 1968 and Dec. 29, 1969, and more particularly to harvesters of this kind adapted for attachment to agricultural linkage tractors.

One object of the invention is to provide a roll forming fodder harvester comprising a frame adapted for attachment to the lifting linkage of a towing tractor whereby it may be raised and lowered thereby, a laterally spaced pair of longitudinally disposed side arms extending rearwardly from the frame, means pivotally connecting the forward end portion of each side arm to the frame whereby said arms may swing upwardly and downwardly about a transverse axis so that their free rear ends may normally rest on the ground, windrow winding means arranged transversely between and supported by the free rear ends of said pivoted side arms, and means so connecting the side arms to the frame as to limit the downward movement of said arms relatively to the frame while permitting them to rise, whereby said side arms may be raised in unison with the said frame.

The said frame is preferably provided with laterally spaced wheels by which it is supported on the ground when the harvester is in use while the free rear ends of the arms are also preferably fitted with wheels or skids which rest on the ground at the commencement of each roll forming operation and when the harvester is detached from the tractor.

Another object of the invention is to provide locking means operable to prevent angular movements of said arms about said transverse pivotal axis thereof, thereby to ensure that the harvester will be stable when detached from the tractor.

A further object is to provide stop means operable to limit the upward movements of said arms about said transverse axis.

Still another object is to provide a roll forming fodder harvester of the aforesaid kind including a laterally spaced pair of longitudinally extending stabilising arms extending rearwardly from the frame and above the said pivoted side arms and having their free end portions so located as to be engageable with the opposite ends of a fodder roll being formed on said windrow winding means.

In order that the invention may be more fully understood, a preferred form thereof is described below with reference to the accompanying drawings in which:

FIG. 1 is a view in side elevation of a roll forming fodder harvester according to the invention, FIG. 2 is a view in sectional rear elevation taken on the line 2—2 of FIG. 1, and FIG. 3 is a view in sectional plan taken on the line 3—3 of FIG. 1.

The fodder harvester shown in the drawings comprises an upright transversely extending main frame, generally designated 10, which is adapted to be attached to the lifting arms 12 and control link 14 of a conventional linkage tractor which is not shown.

This main frame 10 comprises two laterally spaced vertical posts 101 which are rigidly connected by upper and lower transverse beams 102 and 103 respectively.

The lower end of each post 101 is fitted with a transport wheel 16 and the transverse beams 102 and 103 may be provided with forwardly projecting lugs to which the rear ends of the tractor control link 14 and lifting arms 12 are respectively detachably pivotally connected.

Preferably, however, and as shown, the harvester is connected to the tractor linkage by a known type of automatic coupling which comprises a male member 18, of inverted V form, to which the tractor lift arms and control link are pivotally connected, and a correspondingly shaped female member 20 which is secured centrally to the front of the frame 10 of the harvester.

The downwardly diverging arms of the member 20 are of channel shape in cross-section and the flanges thereof project inwardly whereby it forms a socket to receive the member 18 on the tractor linkage. Thus, the harvester may be connected to the tractor by backing the latter up to the former with the male coupling member 18 on the tractor lowered sufficiently to be arranged between the arms of the co-acting member on the tractor. This member 18 is then raised by the tractor lift arms so that it is received within the socket formed by the flanges of the member 20 to which it may be temporarily secured by a retaining pin or the like.

When the harvester is in use, the transport wheels 16 rest on the ground as shown in FIG. 1 but the entire machine may be lifted clear of the ground for transport by the tractor lift arms.

A transverse rock bar 22 arranged behind and close to the said frame structure is pivotally connected to the frame 10 so as to be capable of rocking about an axis disposed transversely with respect to the machine, and for this purpose, each end of the rock beam is connected to a bracket 104 on the adjacent post 101 by a pivot pin 24.

A laterally opposed pair of longitudinally extending side arms 25 extend rearwardly from the rock bar 22, each of these arms being pivotally connected to the respective end portion of the said bar by a substantially vertical pivot pin 26. These side arms normally incline downwardly and rearwardly so that skids 28 on their free rear ends rest on the ground as shown in FIG. 1.

Thus, the said side arms 25 may swing inwardly and outwardly towards and from each other by turning about their respective pivot pins 26, while also they may swing upwardly and downwardly in unison by turning, together with the transverse rock bar 22, about the axis of its pivot pins 24.

One of the side arms 25 is formed with a forward extension 251 which is connected by an obliquely disposed pivoted link 30 to the other side arm at a corresponding position rearwardly of its respective pivot pin 26, whereby these arms are constrained to move inwardly and outwardly in unison. The said side arms are also connected together, a short distance behind the rock bar 22 by an adjustable, pivoted link assembly which comprises a hydraulic cylinder 32 and plunger rod 34, whereby the arms may be caused to move towards and from each other in unison under the control of a suitable valve.

Each side arm 25 is also connected to the adjacent post 101 by an upwardly and forwardly inclined chain 36 or other equivalent lost motion connection which is normally slack, as shown, but which enables the arms to be raised clear of the ground by the main frame 10 when the latter is lifted by the tractor lift arms for transport. When the harvester is supported on a level surface, some slack remains in the chains so that when the machine is operating over undulating ground, the skids 28 may remain in contact with it.

It will be apparent from an inspection of FIG. 1 that as the frame 10, when resting on the ground, is supported only by the opposed pair of transport wheels 16, it would be unstable, when detached from the tractor, if the side arms 25 were free to turn about the transverse pivotal axis of the rock bar 22. In such circumstances, the frame 10 would tend to fall rearwardly at the top by turning about the said transverse axis into an upwardly and rearwardly inclined attitude until further movement was prevented by contact of the frame, or of parts mounted thereon, with the arms 25. In such circumstances, there would be a risk of damage to the mechanism while also it would then be difficult to reconnect the machine to the tractor.

Consequently, provision is made for locking the transverse rock bar 22 to the frame 10 in order to retain the latter in its upright position when detached from the tractor.

For this purpose, the rock bar is provided at any suitable position in its length with a forwardly projecting lug 23 which is arranged in register with the space between a pair of upstanding lugs 44 secured to the top of the transverse beam 103 of the frame. The lugs 44 are formed with co-axially aligned holes and the lug 23 is formed with a corresponding hole which is in register therewith, to enable a detachable locking pin 46 to be inserted therethrough, when the frame 10 is upright and the skids 28 are resting on the ground, as shown in FIG. 1. This locking pin may normally be supported in a retaining socket 47 provided on the beam adjacent to the lugs 44 thereon.

Thus, before the tractor is detached from the harvester, the locking pin 46 is inserted through the holes in the lugs 23 and 44 so as to lock the rock bar 22 to the frame 10 whereby the latter is retained positively in its upright position when the tractor is subsequently disconnected from it.

In order to limit the upward movements of the side arms 25, relatively to the frame 10, the aforesaid forwardly projecting locking lug 23 on the rock bar 22 is formed with an extension 231 which contacts the upper surface of the beam 103 of the frame when the side arms 25 are raised to a predetermined maximum position, thereby to prevent the said arms from fouling any parts of the machine supported on and projecting rearwardly from the upper part of the frame.

Consequently, if inadvertently the rock bar 22 is not locked to the frame before the tractor is detached therefrom and the frame falls rearwardly as previously described, the mechanism is not damaged.

The free rear end of each side arm 25 is provided with a bearing for a rotatable transverse spindle 38 which is direct coupled at its outer end to an individual hydraulic driving motor 40, and a co-axial windrow winding or core member, generally designated 42, is secured to the spindle inwardly of the bearing. When the side arms 25 are disposed in their inner positions, these two rotatable core members are disposed co-axially and substantially in contact as shown.

The said winding or core members 42 are preferably of the kind disclosed in my said copending application Ser. No. 888,354 and as their particular construction does not form a part of the present invention, they are not further described herein.

A transversely extending windrow pick-up device generally designated 52 is supported by and arranged between the posts 101 below the beam 103. This pick-up device may be of any suitable type including those disclosed in my said copending applications but preferably and as diagrammatically shown in the drawings, this device is of the known kind commonly used in hay balers of various kinds. Thus, the illustrated pick-up device comprises a rotor 521 fitted with spaced groups of outwardly projecting pick-up pins 522 which are cam actuated so as to impart a feathering action to each pin in turn as it is withdrawn from the hay. The rotor is enclosed within a fixed tubular housing 523 comprising spaced co-axial sections which define intervening slots 524 through which the pins project outwardly.

When the machine is in use, the rotor is continuously rotated in the direction of the arrow shown in FIG. 1 so that the pins 522 progressively raise the windrow which thus passes over the top of the fixed housing 523 and is again deposited on the ground behind the latter and in advance of the windrow winding means.

The spindle of the pick-up rotor 521 is direct coupled to a hydraulic driving motor 56 arranged at one end thereof. The motors 40 and 56 and the hydraulic cylinder 32 are supplied with hydraulic fluid, through flexible hoses and suitable control valves, from a pump, not shown, which may be mounted on the frame 10 but which is preferably mounted directly on the tractor or on its power take-off shaft.

While the windrow is passing over the pick-up device 52, a plurality of lengths 62 of jute yarn or other suitable flexible material are laid below it as disclosed in my said prior applications, and for this purpose, the required number of spools 64 of yarn are supported side-by-side on a shelf 65 which projects rearwardly from an upper part of the main frame.

The illustrated machine is adapted to lay four lengths of yarn 62 longitudinally below the windrow in spaced apart relationship and, as shown, the spools are of the centre-pull type and the leading end of each yarn is threaded through suitable eyelets by which it is led to the adjacent side of the machine and then downwardly adjacent to the respecitve post 101 to one end of a transverse channel section beam 66 arranged behind the housing of the pick-up device. Each yarn then passes inwardly along the beam to and around a corresponding tensioning device 68 from which during operation of the machine, it is progressively pulled out by the fodder roll 70 as it is being formed about the rotating winding members 44.

At the commencement of the roll forming operation, the side arms 25, which at this time are supported by the skids 28, are swung outwardly so that the distance between the inner ends of the rotary winding members 42 exceeds the width of the windrow. The several lengths of yarn 62 are also pulled out so that they trail behind the pick-up roller for a distance such that they extend below the winding members.

The tractor is then driven over one end of the windrow until its leading end is between the spaced winding members 42 and, during this initial movement of the tractor, the pick-up device 52 progressively lifts the windrow which is then deposited on the ground behind the pick-up device and above the yarn lengths 62.

The side arms 25 are then moved inwardly to their normal operating positions shown in FIG. 2 to engage the windrow and twine lengths 62 as more fully described in my aforesaid copending application Ser. No. 888,354.

The tractor is the driven forwardly along the windrow and the two winding members 42 are driven in unison in the clockwise direction as shown in FIG. 1, the mown material is picked up and wound around them to form the roll 70 which progressively increases in diameter until it reaches a required diameter which may, for example, be about 4 to 7 feet and during this time the side arms 25 are progressively raised by the roll.

In order to restrain the fodder roll against endwise displacement when the machine is travelling over uneven ground and is tilted sidewise, the upper part of each side of the frame is fitted with a stabilizing arm 71 which extends rearwardly therefrom so that its free rear end is normally disposed close to the corresponding end of the roll and above the axis thereof. Thus, the rear ends of these arms are disposed above the level of the windrow winding members when the roll is of the required maximum diameter. These stabilizing arms also facilitate the detachment of the roll from the winding members when, as sometimes happens, one of these members tends to pull the roll with it as the pivoted side arms are moved outwardly in unison.

When the formation of each roll 70 is completed, the tractor is stopped and the side arms 25 are swung outwardly to withdraw the winding members 42 from the opposite ends of the roll. Although the core members move outwardly in arcuate paths, their inwardly convergent form enables them to be extracted with comparative freedom.

After the winding members are thus removed from the roll, they again drop to the ground though their descent is preferably retarded by dashpots 76. The tractor is then driven forwardly through a short distance and during this movement, the yarn lengths 62 are pulled out as they are still connected to the previously deposited roll which serves as an anchor.

The side arms are then again moved inwardly so that the windrow and the yarns are again engaged by the rotary winding members 42 as previously described. Consequently, when the tractor is again driven forwardly to commence the formation of a further roll, the yarns 62 are automatically broken between the winding members and the previously deposited roll.

In order to transport the harvester along roads or the like, it is necessary merely to raise the frame 10 by the tractor linkage to a sufficient height from the ground. During the initial stage of this lifting movement, the slack in the lifting chains 36 is taken up and from this stage onwards the pivoted side arms 25 are lifted bodily together with the frame.

Before the harvester is detached from the tractor, the hole in the locking lug 23 on the rock bar 22, if not already in register with the holes in the coacting lugs 44 on the beam 103, is brought into register and the locking pin 46 is inserted. The control link 14 of the tractor is usually adjustable in length so that if necessary, registration is effected by adjusting this link.

The tractor is then detached and when the aforesaid automatic coupling 18–20 is employed, this is effected merely by lowering the tractor linkage together with the male member 18 after the coupling locking pin or the like is removed.

The harvester is then left standing on the ground and as angular movements of the rock bar 22 are then prevented by the locking pin 46, the frame 10 is positively retained in its illustrated upright position.

I claim:

1. A roll forming fodder harvester comprising a frame adapted for attachment to the lifting linkage of a towing tractor whereby it may be raised and lowered thereby, a laterally spaced pair of longitudinally disposed side arms extending rearwardly from the frame, means pivotally connecting the forward end portion of each side arm to the frame whereby said arms may swing upwardly and downwardly about a transverse axis so that their free rear ends may normally rest on the ground, windrow winding means arranged transversely between and supported by the free rear ends of said pivoted side arms, and means so connecting the side arms to the frame as to limit the downward movement of said arms relatively to the frame while permitting them to rise, whereby said side arms may be raised in unison with the said frame.

2. A roll forming fodder harvester according to claim 1, wherein said means which pivotally connect the side arms to the frame also permit said arms to swing inwardly and outwardly towards and from each other about substantially vertical axes.

3. A roll forming fodder harvester according to claim 1, wherein said means which pivotally connect the side arms to the frame, comprise a transversely extending rock bar pivotally connected to the frame so as to turn about an axis disposed transversely with respect to the harvester and longitudinally with respect to the cross bar, and means pivotally connecting the forward end portion of each side arm to the rock bar about a substantially vertical axis, whereby said arms are constrained to move upwardly and downwardly in unison by turning in unison with said rock bar about its said transversely disposed pivotal axis.

4. A roll forming fodder harvester according to claim 1, wherein each of said lost motion means comprises a flexible connecting member, e.g. a chain, which is connected to the respective pivoted side arm rearwardly of said transverse pivotal axis and which extends upwardly and forwardly therefrom to an adjacent part of the frame.

5. A roll forming fodder harvester according to claim 1 including locking means operable to prevent angular movements of said side arms about the transverse pivotal axis thereof whereby the harvester will be stable when detached from the tractor.

6. A roll forming fodder harvester according to claim 3, including means operable to lock said rock bar to the frame thereby to prevent angular movements of said side arms about said transverse pivotal axis, whereby the harvester will be stable when detached from the tractor.

7. A roll forming fodder harvester according to claim 6, wherein said locking means comprises a lug projecting laterally from the rock bar and a co-acting member on the frame, said co-acting members being formed with holes which are disposed in register when the locking bar is in a predetermined angular position whereby a locking bar may be inserted therethrough.

8. A roll forming fodder harvester according to claim 1 including stop means operable to limit the upward movements of said side arms relatively to the frame.

9. A roll forming fodder harvester according to claim 6 including stop means projecting laterally from said rock bar, and co-acting stop means on the frame arranged to limit the upward movements of said pivoted side arms about their transverse pivotal axis.

10. A roll forming fodder harvester according to claim 1 including a laterally spaced pair of longitudinally extending stabilizing arms extending rearwardly from the frame and above the said pivoted side arms and having their free end portions so located as to be engageable with the opposite ends of a fodder roll being formed on said windrow winding means.

References Cited

UNITED STATES PATENTS

| | | | |
|---|---|---|---|
| 2,597,962 | 5/1952 | Whitley | 56—16.4 |
| 3,110,145 | 11/1963 | Avery | 56—16.4 |
| 3,534,537 | 10/1970 | Buchele et al. | 56—341 |

ANTONIO F. GUIDA, Primary Examiner